Patented Sept. 3, 1946

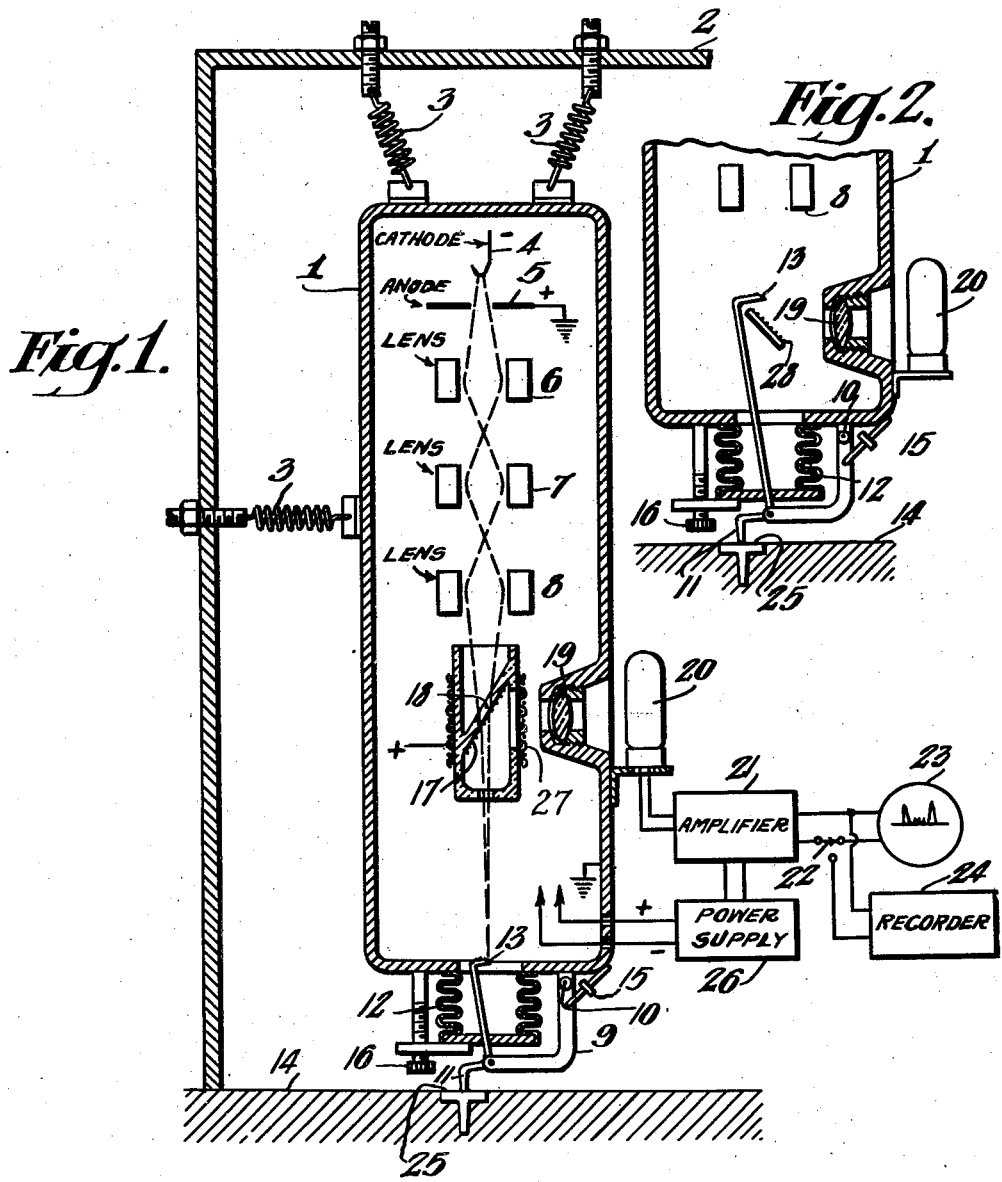

2,406,982

UNITED STATES PATENT OFFICE 2,406,982

ELECTRONIC VIBRATION DETECTING APPARATUS

Vladimir K. Zworykin, Philadelphia, Pa., and James Hillier, Cranbury, N. J., assignors to Radio Corporation of America, a corporation of Delaware Application June 20, 1942, Serial No. 447,864

9 Claims. (Cl. 177—351)

This invention relates generally to vibration detecting apparatus and particularly to vibration detection apparatus which utilizes an electron probe of extremely small cross sectional area which is interrupted by a sharply defined masking element responsive to the source of vibrations under observation.

Heretofore, the sensitivity of vibration detection apparatus has been limited by the phyiscal dimensions of the elements of the apparatus. Such apparatus limitations have in most cases prevented the measurement of vibrations of amplitude less than of the order of a micron. Since by utilizing the teachings of the electron microscope art, it is now possible to provide an electron beam or probe having a cross sectional area of the order of 100 angstrom units, extremely sensitive vibration detection apparatus may be constructed in which such a concentrated electron beam is interrupted by a sensitive element connected to the source of vibrations.

The instant invention includes a conventional electron gun and electron focusing lenses of either the electrostatic or electromagnetic types, enclosed within a relatively heavy evacuated container suitably supported to effectively insulate the unit from the source of vibrations. The particular arrangement of the component elements of the electron beam generating and focusing elements may be as hereinafter described, or may be of the general type described by Manfred Von Ardenne in U. S. Patent 2,257,774, granted October 7, 1941, for an Electronic-optical device.

A sensitively balanced and pivoted movable element is supported by the heavy casing, and is arranged for contact with the source of vibrations. Through a suitable Sylphon vacuum-tight connection, one end of the movable element is enclosed within the vacuum chamber in the path of the finely concentrated electron probe, in such a manner that the electron beam falls upon a sharply defined edge of the movable element. In a preferred arrangement the sharply defined edge of the movable element is highly secondary-electron emissive, and suitable secondary-electron responsive apparatus is associated therewith for indicating the interruption of the electron beam in response to the vibrations under observation. The particular arrangement of the component elements of the secondary-electron responsive apparatus may be of any type well known in the art, or as described in the copending application of James Hillier, Serial No. 445,181, filed May 30, 1942, described hereinafter.

Among the objects of the invention are to provide a new and improved means for detecting vibrations of extremely small amplitude. Another object of the invention is to provide a new and improved means for detecting vibrations of extremely small amplitude in which the detection apparatus is substantially independent of the frequency characteristics of the vibrations. Another object is to provide a new and improved means for detecting vibrations in a body, in which means an electron probe of small cross-sectional area is interrupted by a movable element having a sharply defined edge responsive to the source of vibrations, and in which means secondary-electron responsive means is located in proximity to the point of impingement of the electron beam on the movable element. Still another object of the invention is to provide a new and improved vibration detecting means, as described heretofore, which includes means for generating, indicating, and recording electric currents derived from the secondary electrons emitted by the movable element in response to the vibrations under observation.

The invention will be described by reference to the accompanying drawing in which Figure 1 is a schematic diagram of one embodiment thereof; and Figure 2 is a view partly in section of a modification of a portion of the device shown in Figure 1. Similar reference numerals are applied to similar elements throughout the drawing.

Referring to Fig. 1 of the drawing, a heavy evacuated casing 1 is supported on a suitable frame 2 by means of a plurality of expansion springs 3, to provide a substantially vibration-proof mounting for the casing 1. Within the casing, an electron source 4 is connected to a source of high negative potential, derived from any suitable power source 26. An anode 5, which includes a suitable aperture, and which is at ground potential with respect to the electron source 4, accelerates and concentrates the electrons emitted from the electron source into a suitable beam. A series of electron lenses 6, 7 and 8, of the general type utilized in electron microscopes, focuses the electron beam passing through the aperture in the anode 5 into an electron beam or probe having extremely small cross-sectional area. It should be understood that the lenses 6, 7 and 8 may be of either the electro-magnetic or electrostatic types, and may be of the type employed in the electron microscope art.

A bracket 9 is connected to the evacuated casing 1 through a hinge member 10. A movable lever element 11 is pivoted at the extremity of the bracket 9. The lever element 11 includes a contact element for contact with the source of vibrations. A Sylphon vacuum-tight connection 12 is sealed to the remaining arm of the lever member 11 to permit movement of the lever member within the evacuated casing 1. The extremity 13 of the lever member 11 within the casing 1, terminates in a knife edge preferably having substantial secondary-electron emission characteristics. This knife edge is normally disposed in the path of the finely concentrated electron probe in such a manner that vibrations transmitted, for example, from a body 14 through the lever member 11 will cause interruption of the electron beam or probe by the knife edge 13 at the frequency of the vibrations. The lever member should preferably be made as small and light as possible, in order to provide satisfactory operation for vibrations of below the desired maximum frequency. For the purpose of adjusting the initial position of the knife edge 13 in the path of the electron probe, a screw type adjustment 15 may be provided for the hinge bracket 9 and another screw type adjustment 16 may be provided for adjusting the position of the Sylphon 12 sealed to the lever element 11.

In the path of the finely focused electron beam is a fluorescent screen 17, having an aperture 18 to permit the electron probe to penetrate the screen to the knife edge 13 of the movable element 11. Secondary electrons emitted from the knife edge 13 are attracted to the fluorescent screen 17, which is at a potential more positive than the electron source 4 and the grounded casing 1, due to a positive potential applied to a screen 27 surrounding the fluorescent screen. Impingement of electrons on the fluorescent screen 17 produces fluorescence thereof which is imaged by an optical lens 19 sealed in a suitable window in the evacuated casing 1, upon a light sensitive device 20 supported in proximity to the lens. The light sensitive device 20 may be either a photoelectric cell or an electron multiplier of any suitable type well known in the art. The output of the light sensitive device 20 is connected to the input of an amplifier 21 designed to amplify efficiently the frequencies to be observed. The output of the amplifier 21 is connected, through a switch 22, to either a cathode ray oscilloscope 23 or a recorder 24. It should be understood that the characteristics of the indicator 23 and the recorder 24 may be suited to the particular type of indication or recording desired, and that the particular apparatus may be of any type well known in the art.

The electron focusing lenses are adjusted to provide an electron beam of the smallest possible cross-sectional area at the point of impingement of the electron beam with the knife edge 13 of the movable element 11. If the casing 1 is supported in proximity to the vibrating body 14, the bracket 9 is adjusted by the adjusting device 15, and the movable element 11 is adjusted by the adjusting device 16, so that the knife edge 13 just intersects the electron beam when no vibrations are transmitted to the movable lever element 11. Since the sensitive movable lever element provides a leverage of several times, it is apparent that the most minute vibrations applied to the lever element 11 will completely interrupt the electron beam at the frequency of the vibrations from the source 14. It should be understood, however, that a lever type vibration transmitting element is not essential, and that any other sensitive means may be provided for interrupting the electron probe. For most efficient operating a carefully prepared contacting surface 25 should be provided for the vibrating body 14 at the point of contact with the movable lever element 11. It should further be understood that additional mechanical modifications may be provided in the structure of the lever or contact element, and for locating and adjusting accurately the position of the casing 1 and the movable element 11 with respect to the vibrating body 14 without departing from the spirit and scope of the invention.

Fig. 2 is similar to Fig. 1 with the exceptions that a solid fluorescent screen 28 is used instead of the apertured screen 17 of Fig. 1, the accelerating screen 27 is omitted and the knife edge 13 of the movable elever element 11 interrupts the electron probe at a point between the third lens 8 and the solid fluorescent screen 28. Accordingly the solid fluorescent screen is responsive to the primary electrons of the electron probe which are not interrupted by the movable element knife edge 13. Otherwise the operation and construction is similar to that of the device of Fig. 1.

We claim as our invention:

1. An electronic device for detecting vibration in a body, said device including a relatively heavy evacuated envelope enclosing means for generating an electron beam, and means for deriving from said beam an electron probe of small cross-sectional area, a movable element having a sharply defined edge enclosed within said envelope responsive to said vibration of said body, means for focusing said electron probe at said edge of said element, and means including electron responsive means enclosed within said envelope responsive to said movement of said edge of said element for deriving an electric current of amplitude proportional to a function of said movement.

2. An electronic device for detecting vibration in a body, said device including a heavy evacuable container, vibration insulating means for supporting said container in proximity to said body, means for generating an electron beam and means for deriving from said beam an electron probe of small cross-sectional area, a movable element having a sharply-defined secondary electron emissive edge enclosed within said container responsive to said vibration of said body, means for focusing said electron probe at said edge of said element, means for collecting secondary electrons from said edge of said element and a fluorescent screen enclosed within said container, means for applying said secondary electrons to said screen to produce fluorescence thereof, and light responsive means for deriving an electric current proportional to a function of said fluorescence.

3. A device of the type described in claim 2 including current indicating means, and means for applying said derived current to said indicating means.

4. A device of the type described in claim 2 including current recording means, and means for applying said derived current to said recording means.

5. An electronic device for detecting vibration in a body, said device including a heavy evacuable container, vibration insulating means for supporting said container in proximity to said body, means for generating an electron beam and means enclosed within said container for deriving from said beam an electron probe of small cross-sectional area, a movable element having a sharply-defined secondary electron emissive edge enclosed within said container responsive to said vibration of said body, means for focusing said electron probe at said edge of said element, means for collecting secondary electrons from said edge of said element, a fluorescent screen enclosed within said container, means for applying said secondary electrons to said screen to produce fluorescence thereof, and light responsive means including a photo-electric device and an amplifier connected to said photoelectric device for deriving an electric current proportional to a function of said fluorescence.

6. An electronic device for detecting vibration in a body, said device including an evacuated envelope enclosing means for generating an electron beam, a movable element responsive to vibration of said body, said element having a sharply-defined movable edge enclosed within said envelope, means for focusing said beam to provide an electron probe of small cross-sectional area impinging upon said edge of said movable element, and means including electron responsive means enclosed within said envelope responsive to said movement of said edge of said element for deriving an electric current of magnitude proportional to a function of said movement.

7. An electronic device for detecting vibration in a body, said device including an evacuated envelope enclosing means for generating an electron beam, a movable element responsive to vibration of said body, said element having a sharply-defined movable edge enclosed within said envelope, means for focusing said beam to provide an electron probe of small cross-sectional area impinging upon said edge of said movable element, and means including electron responsive means enclosed within said envelope responsive to electrons of said probe passing said edge of said element for deriving an electric current of magnitude proportional to a function of said movement.

8. An electronic device for detecting vibration in a body, said device including an evacuated envelope enclosing means for generating an electron beam, a movable element responsive to vibration of said body, said element having a sharply-defined movable edge enclosed within said envelope, means for focusing said beam to provide an electron probe of small cross-sectional area impinging upon said edge of said movable element, means for collecting secondary electrons from said edge of said element in response to said impingement of said electron probe thereon, and means including secondary electron responsive means enclosed within said envelope responsive to said movement of said edge of said element for deriving an electric current of magnitude proportional to a function of said movement.

9. An electronic device for detecting vibration in a body, said device including an evacuated envelope enclosing means for generating an electron beam, a movable element responsive to vibration of said body, said element having a sharply-defined movable edge enclosed within said envelope, means for focusing said beam to provide an electron probe of small cross-sectional area impinging upon said edge of said movable element and providing secondary electron emission therefrom, a fluorescent screen enclosed within said envelope, and means for applying said secondary electrons to said fluorescent screen to provide fluorescence thereof proportional to a function of said movement of said edge of said element.

VLADIMIR K. ZWORYKIN.
JAMES HILLIER.